INVENTOR.
GEORGE F. MORRIS

Sept. 14, 1965   G. F. MORRIS   3,206,754
AMBIGUITY ELIMINATION OF DIRECTIONAL ANTENNA
Filed Nov. 9, 1962   2 Sheets-Sheet 2

United States Patent Office 3,206,754
Patented Sept. 14, 1965

3,206,754
AMBIGUITY ELIMINATION OF DIRECTIONAL ANTENNA
George F. Morris, Pittsford, N.Y., assignor to General Dynamics Corporation, Rochester, N.Y., a corporation of Delaware
Filed Nov. 9, 1962, Ser. No. 236,661
5 Claims. (Cl. 343—117)

This invention relates to signal seeking systems and is particularly directed to means for selecting the signal of maximum amplitude from among a plurality of signals.

Radio communications, radar, and radio navigation equipment are examples of high frequency gear which is required from time to time to scan a spectrum of frequencies or a series of signals and to "lock on" one of the signals. A motor driven tuner or a motor driven directional antenna can easily scan and successively record the signals. It is not easy, however, to stop the scanning means on the one signal which is characterized, say, by the maximum amplitude in the series.

An object of this invention is to provide means for selecting a maximum amplitude signal from among a plurality of signals.

In one type of direction finders employed for tracking targets or point-source signals, antennae usually of the dish type are adapted to radiate and/or receive two slightly angularly displaced signal lobes so that when the two lobes are rapidly switched the antenna can be servoed to a position where the signal source lies on a line bisecting the angle of displacement of the two lobes. Unfortunately, directional antenna always have side or back lobes displaced from the main lobes. This means that a strong signal received from the rear may appear as a main lobe signal and will cause the tracking mechanism to lock on the back signal and cause a large error.

Accordingly, a further and more specific object of this invention is to provide means for excluding possible error caused by the side and back lobes of a directional antenna.

The objects of this invention are attained by driving the signal seeking means, such as a directional antenna, through one complete scanning cycle or rotation without interruption. The maximum signal received during this scan is stored and is applied to the gain control circuits of the receiving amplifiers. Such a gain control voltage establishes the RF or IF amplifier bias corresponding to the gain or sensitivity of the receiver for that maximum signal. The motor then continues to drive the signal seeking mechanism, or directional antenna, through a second scan. Since the gain or amplification for a given sensitivity of the receiver has been established, during the first scan, at a predetermined level, only the signal of maximum amplitude can pass the receiver amplifiers during the second scan. The signal thus accepted is employed to arrest the scanning operation and to permit the receiver to lock on to the signal of maximum amplitude. In the case of a motor driven directional antenna employed for navigation purposes, the accepted signal is employed to interrupt scanning and initiate tracking operations.

Other objects and features of this invention will become apparent to those skilled in the art by referring to the specific embodiment described in the following specification and illustrated in the accompanying drawings in which.

Figure 1:
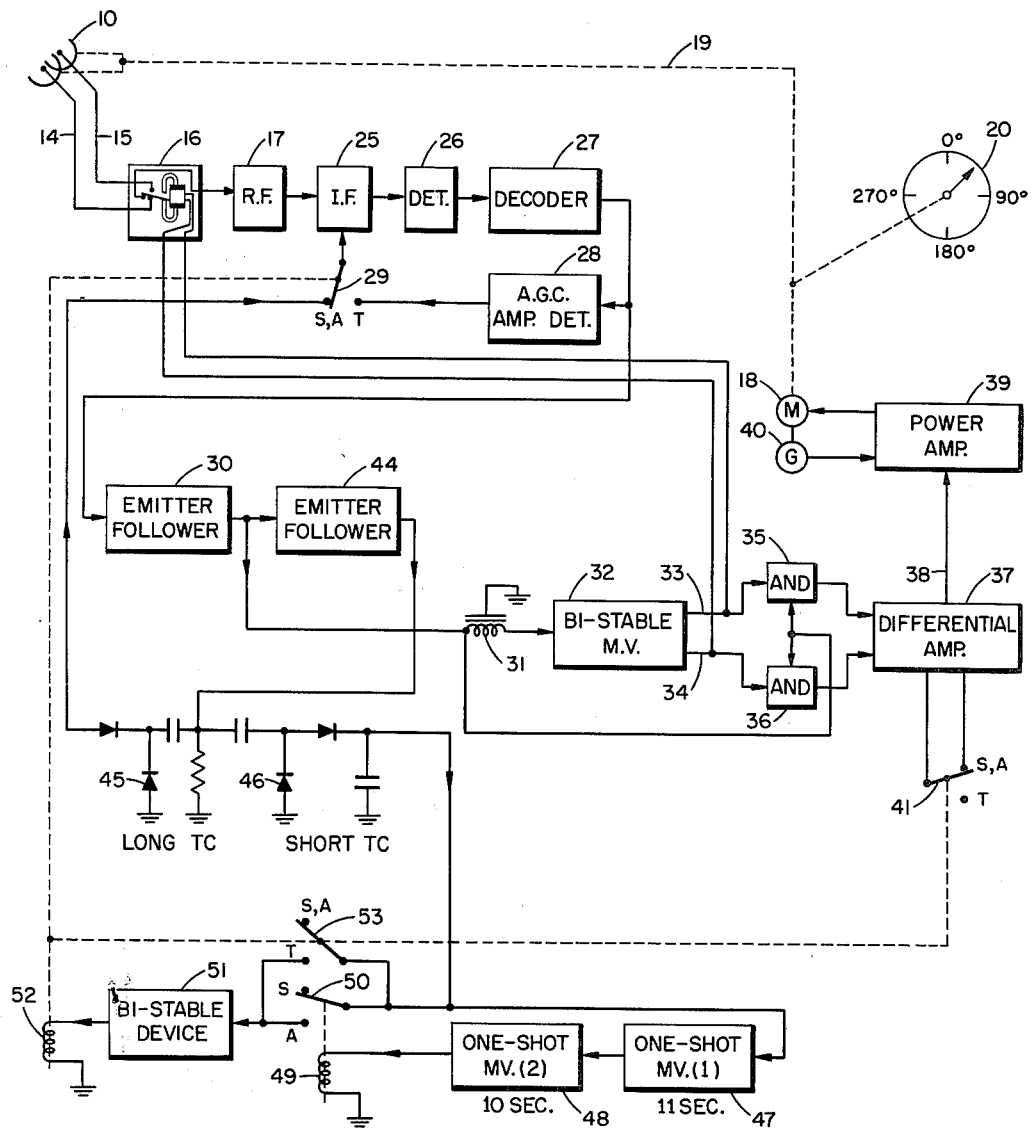
FIG. 1 is a block diagram of a system employing the signal seeking features of this invention, the particular system shown being for navigating purposes.
Figure 2:
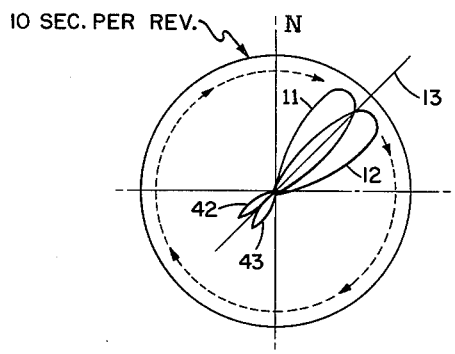
FIG. 2 is a polar diagram of the rotating directional antenna and its forward and backward lobes employed in the system of FIG. 1.

The specific embodiment illustrated in FIG. 1 comprises a radio navigation receiver of the type which may be used in tacan, and which is adapted to employ the maximum signal seeking features of this invention. The directional antenna 10 comprises any reflector structure with at least two probes suitably disposed in the reflector to produce two slightly diverging beams or signal pattern lobes. The lobes are customarily of the shape shown at 11 and 12 of the polar diagram of FIG. 2. Any signal source or target lying on line 13 will produce signals of equal amplitude on the two feedlines 14 and 15. When the signals on lines 14 and 15 are rapidly switched by solid state switching mechanism 16 (shown diagrammatically as a relay, which may be of the polarized type) into the RF amplifier 17, a signal can be obtained of the proper amplitude and polarity to drive motor 18 in either direction. Motor 18 is mechanically connected to the directional antenna through reduction gears and mechanical link 19 to continuously rotate the antenna during search, or to reversibly move the antenna in either direction to follow or "track" the received signal after lock-on. The azimuthal position of the antenna is preferably indicated on dial 20, which shows 360° of the compass and has a pointer mechanically or electrically linked to the antenna drive mechanism. The receiving system for driving the motor in FIG. 1 includes the RF amplifier 17 with a first detector, the IF amplifier 25, the detector 26, and in the case of a tacan receiver, the decoder 27. Detector 26 generates a series of pulses, the characteristics of which are acceptable to the decoder. The gain of the receiving system is normally controlled by the automatic gain control amplifier and detector 28 which integrates the decoder output to produce a direct current biasing voltage which is proportional to the average amplitude of the received signal and which is fed back to the IF and/or RF amplifiers of the receiver in the usual manner to control the sensitivity of the amplifier as the received signal level increases or fades. The direct current bias, in the example of FIG. 1, is applied to the intermediate frequency amplifier portions of the receiver through switch 29. In the normal tracking mode, the switch is closed on contact T, and during the search and acquisition mode, described below, the switch is closed on contact S, A.

The output of the decoder is also current amplified, as by the emitter-follower 30. After a slight delay in delay line 31, the received decoded pulses drive the bistable multivibrator 32 so that the output lines 33 and 34 of the multivibrator are alternately energized at the frequency of the decoded pulses. The output signals of lines 33 and 34 are applied, respectively, to one input each of the early-late AND gates 35 and 36. The other inputs of the AND gates 35 and 36 are connected in parallel and directly to the output of the current amplifier, emitter-follower 30. The outputs of the early-late AND gates 35 and 36 are compared in the differential amplifier 37 to produce at the output 38 of the amplifier a zero voltage when the two signals from the two lobes 11 and 12 are equal, and a plus or minus voltage when the signals are unbalanced. The error signal at 38 is amplified in power amplifier 39 sufficiently to drive reversible motor 18 in either direction. To reduce hunting and stabilize the servo system, the tachometer generator 40 senses the rate or speed of motor 18 to control the gain of the power amplifier 39. By means of switch 41, the differential amplifier can be unbalanced so as to continuously drive motor 18 in one direction. Unbalance is effected when the switch is closed on contact S, A. During search and acquisition of a signal, contacts S, A of switch 41 are closed, and during tracking the contacts are opened to the tracking contact T. By mechanisms which will be described, switches 29 and 41 normally rest on contacts S, A during search and acquisition and are shifted to "track" contacts T when a suitable signal is received.

The directional antenna 10 invariably has two or more back lobes, as shown at 42 and 43, and is capable of receiving a strong signal from the rear. Such a signal will be received, amplified, and decoded, and can operate the tracking mechanisms and cause the antenna to falsely "track" a signal received from the rear. According to this invention, the antenna is driven without interruption through one complete revolution so that all forward and backward signals are scanned. The sensitivity of the receiver circuits are adjusted by the maximum signal received during the first scan. Then, a second scan is started; and since only the maximum signal is of sufficient strength to register a receiver output, the receiver output during the second scan can be employed to arrest scanning action when that signal is received.

In the embodiment shown in FIG. 1, the decoded signals are preferably current amplified in emitter-follower 44. The output of emitter-follower 44 is coupled to detectors 45 and 46, which are coupled, respectively, in long and short time constant networks. By long time constant is meant a circuit which will hold a voltage substantially undiminished for a period during two revolutions of the antenna. The short time constant is short enough to decay immediately after receipt of signals from the follower 44. The first signal received by the receiver is applied through the short time constant circuit to the one-shot multivibrator 47. The duration of the unstable state of the one-shot multivibrator is equal to or slightly greater than one scanning period or one revolution of the antenna. When the one-shot multivibrator 47 returns to its stable state, the second one-shot multivibrator 48 is triggered and the coil 49 is energized. Energization closes switch 50 which, in turn, operates the bistable device 51, such as a Schmitt trigger circuit, to energize coil 52. Coil 52 operates the contacts of switches 29, 41 and 53. Device 51 triggers in one direction when the input potential is raised to a critical value, and triggers in the reverse direction when the input is reduced to another value.

To start operation, all contacts are returned to S, A position and power is applied to the motor to start rotation of the antenna. When the first signal is received, the sensitivity of the receiver is at a maximum and the first signal, even of minimum amplitude, is received, amplified and decoded. This first signal operates one-shot multivibrator 47 and the motor continues through one complete scanning cycle. Thereupon, the second one-shot multivibrator 48 is operated for a second period of time equal to the scanning period, and relays 49 and 52 are energized. As the scanning continues, the signal of maximum amplitude is encountered, is decoded, and establishes maximum bias voltage across the long time constant circuit 45. During the second scan, the weaker signals are excluded by the gain control bias and only the signal of maximum amplitude is passed and decoded. Accordingly, during the second scan, only the strong signal is received and is applied through contacts 50 to the trigger device 51 and to the coil of relay 52 to hold it. Since relay 52 is energized, all connected contacts are moved to "track." This means that the differential amplifier is now permitted to function normally and to stop the motor when the strongest signal has been received the second time. Contacts 29 are closed to permit normal automatic gain control voltages to be fed back to the IF amplifier 25 and the now acquired strong signal continues to hold relay 52 and contacts 53 in the T position.

Figure 3:
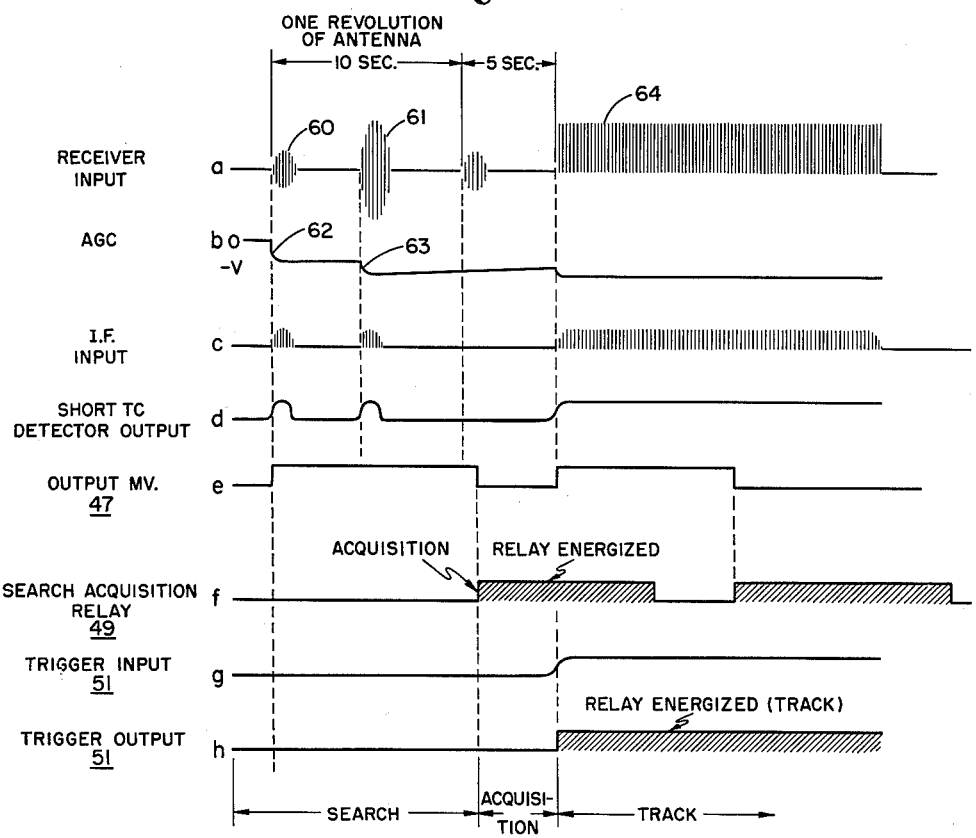
FIG. 3 is a set of voltages of the principal points in the sytem of FIG. 1.

The sequence of operation may be read directly from the set of voltage waveforms of FIG. 3. On line $a$ is shown the signal envelope at the receiver input, and it is assumed that, first, a weak signal 60 is received. If it is assumed that the antenna revolves in ten seconds, the strong or forward signal 61 is received five seconds later. Each signal 60 and 61 is decoded and establishes an automatic gain control voltage at 45, FIG. 1, which changes in steps, as shown at 62 and 63, line $b$. The maximum AGC bias voltage is established by the maximum signal. The output of the IF amplifier is shown on line $c$. During the second scan, the weak signal 60 is again received, but is not passed through the now highly biased IF amplifier. The steady signal 64, of line $a$, indicates signal 61 has been received during the second scan and that search by the motor driven antenna has ceased and that tracking has commenced. It will be noticed that the pulse train picked up by the back lobe on the second revolution of the antenna is completely eliminated by the AGC voltage generated by the main lobe. Line $d$ is the output of the short time constant detector. This direct current voltage follows closely the envelope of the output of the IF amplifier. On line $e$, the output of the one-shot multivibrator 47 shows that this multivibrator is triggered by the positive-going edge of the short time constant detector output. Multivibrator 48 is triggered by the negative-going edge of multivibrator 47, and on line $f$ is shown the output of the multivibrator, the current of which may be the same as the current through the search-acquisition relay 49. The input of trigger circuit 51, shown on line $g$, is energized by 46 through contacts 50 only after the maximum signal has been received the second time. The output of trigger 51, and the current through relay 52, is shown on line $h$. Only when the contacts 41 of the search-track relay 52 is in the "track" position can the differential amplifier function and the antenna drive respond to error signals and servo the antenna for normal tracking.

It is now apparent that the system shown in FIG. 1 will scan all signals throughout one scanning cycle to establish minimum sensitivity of the receiver, and that, thereafter, in the second cycle, only the signal of maximum amplitude is received and tracking permitted. Many modifications may be made in the components of this invention without departing from the scope of the invention as defined in the appended claims.

What is claimed is:

1. A system for finding the maximum signal from among a plurality of signals, said system comprising an amplifier, said amplifier including a gain control circuit responsive to a gain control voltage for varying the gain of said amplifier, means for firstly sampling the amplitude of each of said plurality of signals, a memory circuit for storing a voltage representative of the maximum signal, means for applying the stored voltage to said gain control circuit and means for secondly successively sampling said plurality of signals while said gain control circuit is biased by said stored voltage, so that only signals of maximum amplitude will pass said amplifier.

2. A signal seeking system comprising an amplifier with an automatic gain control circuit, drive means for successively applying each of all of a series of different signals to said amplifier, means for adjusting the gain of said amplifier to a level corresponding to the maximum amplitude of said signals, and means for thereafter arresting said drive means when said signal of maximum amplitude is received.

3. A radio receiver tracking system comprising a directional antenna, a reversible motor for driving said directional antenna through search and tracking phases, said receiver including an amplifier responsive to signals received from said antenna, automatic gain control circuits for feeding gain control information to said amplifier, two detector circuits having, respectively, long and short time constants, means for applying detected signals from said long time constant circuits to said automatic gain control, means responsive to said short time constant circuits for continuously driving said antenna through a complete scanning cycle, means for generating a gain bias corresponding to the maximum signal received, and means responsive to said short time constant circuits for interrupting said motor drive during the second scan.

4. In a radio receiver with an automatic gain control circuit and a movable directional antenna with a reversible motor for driving said antenna to track a signal source, the combination comprising a servo loop including an early-late gate means responsive to received signals for driving said motor to track said signal source, said loop including means for disabling said loop to continuously drive said motor during search for said signal source; means for operating said disabling means after one complete revolution of said antenna, means for applying to the gain control circuits of the receiver a gain control voltage corresponding to the maximum signal acquired during said one revolution, and means for restoring reversibility of said motor in said loop in response to the first signal received during the second antenna revolution.

5. A system for finding the maximum signal from among a plurality of signals comprising an amplifier, said amplifier including gain control means for varying the sensitivity of the amplifier, means for firstly successively applying all of said plurality of signals to said amplifier, a peak detector circuit with a relatively long time constant responsive to the signals passed by said amplifier for establishing a gain control voltage and the sensitivity of said amplifier in response to the applied signal of maximum amplitude, means for secondly successively applying all said plurality of signals to said amplifier while said gain control voltage is applied, and means for then utilizing the first signal passed by said amplifier.

References Cited by the Examiner

UNITED STATES PATENTS 3,042,917   7/62   Elhoff _____ 343—117
3,069,637   12/62   Seeley _____ 334—16

CHESTER L. JUSTUS, *Primary Examiner.*